Patented Jan. 22, 1924.

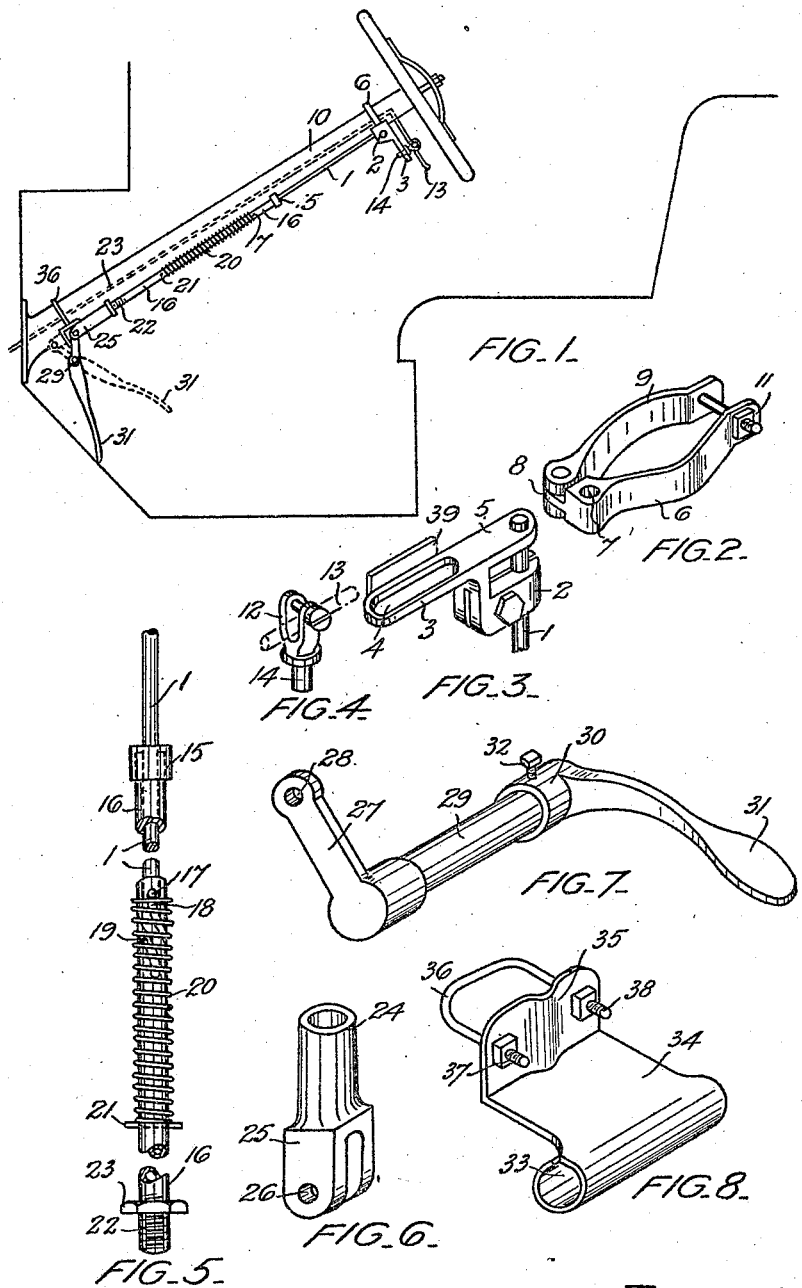

1,481,769

UNITED STATES PATENT OFFICE.

HENRY JAMES WILLIAMS, OF PALMERSTON NORTH, NEW ZEALAND, ASSIGNOR OF ONE-THIRD TO NATHANAEL ISAIAH WILHELM BROWN AND ONE-THIRD TO CHARLES ABEL PETERS, BOTH OF PALMERSTON NORTH, NEW ZEALAND.

FOOT ACCELERATOR FOR MOTOR VEHICLES AND THE LIKE.

Application filed May 10, 1922. Serial No. 559,965.

*To all whom it may concern:*

Be it known that I, HENRY JAMES WILLIAMS, care of C. A. Peters, garage proprietor, Palmerston North, motor mechanic, citizen of the British Empire, residing at Palmerston North, New Zealand, have invented certain new and useful Improvements in and Relating to Foot Accelerators for Motor Vehicles and the like, of which the following is a specification.

This invention relates to foot accelerators for motor vehicles and the like and in particular has for its object to provide a simple, cleap and easily attachable accelerator to motor cars having a throttle control system such as, or similar to, that of the well known Ford motor cars wherein the throttle control comprises a connecting rod running up inside the steering column and having its upper end bent outwards to be manipulated and turned as desired by the driver's hand. As is well known, it is very desirable to have auxiliary means in addition to hand control for operating the throttle control.

Heretofore all accelerator attachments have been located essentially beneath the body of the car. In this invention a feature is the provision of an accelerator operated by the foot of the driver and which is located above the body of the car and between the dashboard and the steering wheel and which by suitable means actuates the ordinary throttle control on the steering quadrant. A further feature of the invention is making the accelerator easily detachable and attachable to the ordinary steering column and which does not necessitate any alteration to the ordinary mechanism of the car. The invention consists in these features and in the features and arrangements and combinations of parts hereinafter described and more particularly pointed out in the claims.

Referring to the accompanying drawings, which illustrate the preferred embodiment of the invention, Figure 1 is a side elevation of the device in position on the steering post, Figure 2 is a perspective elevation of the upper clamp, Figure 3 is a perspective elevation of the control lever at the top of the spindle, Figure 4 is a perspective elevation of the control lever forks, Figure 5 is an elevation of the main spindle and tube showing the slotted grooves in the sleeve, Figure 6 is a perspective elevation of the lower fork, Figure 7 is a perspective view of the foot pedal, spindle and lever and Figure 8 is a perspective view of fulcrum bracket and bottom clamp.

The spindle 1 is secured at its top end to the split boss 2 of the control lever 3 which is provided with a slot 4 and an extension 5.

The clamp 6 is revolvable at hole 7 in clamp 6 between boss 2 and extension 5 of the control lever 3. A lug 8 on the clamp 6 forms a pivot for the arm 9 allowing it to swing open for attachment to the steering column 10, to which it is clamped by the bolt 11.

A fork 12 (through the legs of which is placed the ordinary control lever 13) has a circular shaped end 14 which engages in the slot 4.

The lower end of the spindle 1 passes through the enlarged end 15 of the tube 16 and is provided with a pin 17 which projects laterally and engages in helical slots 18 and 19 cut in the sides of the tube 16. This enlarged end 15 forms a bearing for the spindle 1. Instead of an enlarged end the tube may be suitably tapered to give a similar effect. The pin 17 also bears against the upper end of a spring 20 which at its lower end bears against a pin 21 passing through and secured to the tube 16.

The extreme lower end 22 of the tube 16 is provided with a lock nut 23. To this threaded end is attached the boss 24 of a crosshead or fork 25, having a hole 26. A lever 27 having a hole 28 is pivotally secured to the legs of the fork 25. The other end of the lever 27 forms an integral part of a spindle 29, to the extreme end of which is attached the boss 30 of the foot pedal 31 by means of a set screw 32.

The spindle 29 is supported in the circular portion 33 of the fulcrum bracket 34 the opposite end of which is bent and shaped to form one side of a clamp 35, and is provided with a U shaped bolt 36 having ends 37, 38 which pass through clamp 35 and are secured by nuts. The fulcrum bracket 34 is secured by means of this clamp to the steering column 10.

It is obvious that this attachment is applicable to motor vehicles with either a left or a right hand drive as for a left hand drive the helical slots in the spindle need only be cut in such a manner that the pin sliding therein will cause the spindle to revolve in the opposite direction.

In operation, the operator depresses the lever 31 with his foot, thereby causing the lever 27 to move upwards, and said lever 27 being attached to the tube 16 by means of the cross head 25, the tube 16 is correspondingly forced upwards compressing the spring 20 against the pin 17 of the spindle 1. The spindle 1 being secured against longitudinal movement by the clamp 6, is caused to rotate in a lateral direction by the pin 17 moving helically in the slots 18 and 19 as the tube 16 is moved vertically upwards.

The rotation of the spindle 1 actuates the control lever 3 radially which in turn operates the ordinary control lever 13 by means of the forks 12.

It is to be understood that any ordinary available suitable means may be used to cause the pressure of the foot pedal to actuate the ordinary throttle control lever such as arrangements of cams, pawls, pivoted levers and such like and the invention is not limited to the specific embodiment herein shown except so far as is necessary to sustain the validity of the following claims:—

I claim:—

1. An accelerator comprising hand operable control mechanism, a foot pedal actuating means connecting said control mechanism and said foot pedal comprising a spindle secured against longitudinal movement, a pin arranged through the spindle, a tube associated with the spindle and having helical grooves engaged by said pin, a spring about the tube and means adapted to compress the spring so as to rotate said spindle upon the depression of said foot pedal.

2. An accelerator comprising hand operable throttle control mechanism, a foot pedal, an actuating spindle, operable means connecting said spindle and said foot pedal, cooperative engaging means between the upper end of said spindle and the throttle control whereby on depression of said foot pedal said control mechanism is operated.

3. An accelerator comprising hand operable throttle control mechanism, a foot pedal, an actuating spindle, operable means connecting said spindle and said foot pedal, a slotted element carried by the upper end of the spindle, a forked shank engageable in the slotted element and having engagement with the ordinary throttle control whereby upon the depression of said foot pedal said control mechanism is operated.

4. An accelerator comprising in combination with a steering column of a motor vehicle and a swingable handle portion of a fuel controlling throttle, a bracket secured to the lower part of the throttle, a foot pedal fulcrumed on the bracket, a tube connected with the foot pedal and provided with helical grooves, a spindle telescoped by the tube, a pin in the spindle engaged by the grooves in the tube, resilient means embracing the tube and acting against the pin so that upon depression of the foot pedal the spring will be compressed to effect rotation of the spindle, a clamp arranged about the upper part of the steering post and serving to rotatably support the spindle, a slotted lever carried by the upper end of the spindle and means operatively connecting the lever with the hand throttle, substantially as and for the purposes set forth.

5. In an arrangement as claimed in claim 6 wherein the element and the means connecting the same with the hand throttle consists of a bifurcated body portion which is clamped to the spindle in a manner to embrace the clamp and an extension projecting from the body portion provided with a slot, a forked shank slidable in the slot and having the arms slidably embracing the sides of the hand throttle.

6. An arrangement as claimed in claim 6 wherein the supporting bracket for the foot pedal consists of a body portion, an attaching portion and a journalling portion, means for securing the attaching portion to the steering column and wherein the foot pedal includes a spindle arranged in the bearing portion, an arm on one end of the spindle engageable with the tube and a foot engaging portion on the other end of the spindle.

In testimony whereof I have hereunto set my hand in presence of two subscribing witnesses.

HENRY JAMES WILLIAMS.

Witnesses:
H. T. FLYGEE,
THOMAS BASTIN.